US009903691B1

(12) United States Patent
Hyde et al.

(10) Patent No.: US 9,903,691 B1
(45) Date of Patent: Feb. 27, 2018

(54) ELECTRO-SHOCK PROJECTILE LAUNCHER

(71) Applicant: Elwha LLC, Bellevue, WA (US)

(72) Inventors: Roderick A. Hyde, Redmond, WA (US); Lowell L. Wood, Jr., Bellevue, WA (US)

(73) Assignee: Elwha LLC

( * ) Notice: Subject to any disclaimer, the term of this patent is extended or adjusted under 35 U.S.C. 154(b) by 0 days.

(21) Appl. No.: 15/252,440

(22) Filed: Aug. 31, 2016

(51) Int. Cl.
| | |
|---|---|
| F41H 13/00 | (2006.01) |
| F41F 1/00 | (2006.01) |
| F42B 10/62 | (2006.01) |
| F41G 1/35 | (2006.01) |

(52) U.S. Cl.
CPC ........... *F41H 13/0025* (2013.01); *F41F 1/00* (2013.01); *F41G 1/35* (2013.01); *F42B 10/62* (2013.01)

(58) Field of Classification Search
CPC ............. F41H 13/0025; F41H 13/0012; F41H 13/0018; F41H 13/0031; F41H 13/0037
USPC .................................................. 102/502, 504
See application file for complete search history.

(56) References Cited

U.S. PATENT DOCUMENTS

| | | | |
|---|---|---|---|
| 7,042,696 B2 | 5/2006 | Smith et al. | |
| 7,781,709 B1 | 8/2010 | Jones et al. | |
| 7,984,676 B1 | 6/2011 | Gavin et al. | |
| 8,716,639 B2 | 5/2014 | Mallon | |
| 2002/0170419 A1* | 11/2002 | Borgwarth | F41H 13/0025 89/1.11 |
| 2005/0188593 A1* | 9/2005 | Cerovic | F41A 19/58 42/77 |
| 2006/0256498 A1 | 11/2006 | Smith et al. | |
| 2007/0007384 A1 | 1/2007 | Sliwa, Jr. | |
| 2007/0028501 A1* | 2/2007 | Fressola | F41H 13/0025 42/146 |
| 2007/0297116 A1 | 12/2007 | Cerovic et al. | |
| 2009/0178597 A1 | 6/2009 | Sliwa, Jr. | |
| 2010/0303290 A1* | 12/2010 | Mathe | G06K 9/00342 382/103 |
| 2013/0100129 A1* | 4/2013 | Mathe | G06K 9/00342 345/419 |
| 2014/0153153 A1 | 1/2014 | Hanchett et al. | |
| 2014/0111902 A1 | 4/2014 | Hinz et al. | |
| 2014/0293499 A1 | 10/2014 | Beechey et al. | |

(Continued)

OTHER PUBLICATIONS

Clark, Heather; "Sandia's self-guided bullet prototype can hit target a mile away"; Sandia Labs News Releases; Jan. 30, 2012; pp. 1-5; Sandia Corporation.

*Primary Examiner* — Joshua E Freeman

(57) ABSTRACT

Described embodiments include an electro-shock projectile launcher, a method, and a system. An electro-shock projectile launcher includes a deployment tube configured to launch an electro-shock projectile toward a target human. The launcher includes a recognition circuit configured to recognize a body portion of the target human authorized for administration of a selected electric shock by electro-shock projectiles. The launcher includes a guidance circuit configured to determine a flight path of the electro-shock projectile from the deployment tube to the recognized body portion of the target human. The launcher includes an activator circuit configured to initiate a launch from the deployment tube of the electro-shock projectile along the determined flight path in response a received authorization.

41 Claims, 9 Drawing Sheets

(56) References Cited

U.S. PATENT DOCUMENTS

| | | | |
|---|---|---|---|
| 2015/0108215 A1* | 4/2015 | Ehrlich | G01S 17/88 235/404 |
| 2015/0153137 A1* | 6/2015 | Newzella | F41G 1/01 42/140 |
| 2016/0010956 A1 | 1/2016 | Hanchett | |
| 2016/0010957 A1 | 1/2016 | Beechey et al. | |
| 2016/0033244 A1 | 2/2016 | Minnicino, II | |
| 2016/0069644 A1* | 3/2016 | Bell | F41G 11/001 89/204 |
| 2016/0252325 A1* | 9/2016 | Sammut | F41G 1/38 42/122 |

* cited by examiner

FIG. 5

510 Means for targeting a human to be administered a selected electric shock by an electro-shock projectile, the electric shock selected to inhibit voluntary movement by the target human without exceeding a safely standard for the recognized body portion of the human target.

520 Means recognizing a body portion of the target human authorized for an administration of the selected electric shock by electro-shock projectiles.

530 Means for determining a flight path of the electro-shock projectile from a deployment tube of an electro-shock projectile launcher to the recognized body portion of the target human.

540 Means for initiating a launch of the electro-shock projectile from the deployment tube and along the determined flight path in response a received authorization.

550 Means for capturing an image of at least a portion of the target human, and wherein the means for recognizing includes means for recognizing in the captured image at least one body portion of the target human authorized for administration of the selected electric shock by electro-shock projectiles.

560 Means for outputting the selected electric shock through electrode-contacted tissue of the target human.

570 Means for selecting the electric shock to have an excitation voltage, current, or duration parameter responsive to a safe tolerance level of the recognized target human body portion while inhibiting voluntary movement by the target human.

500

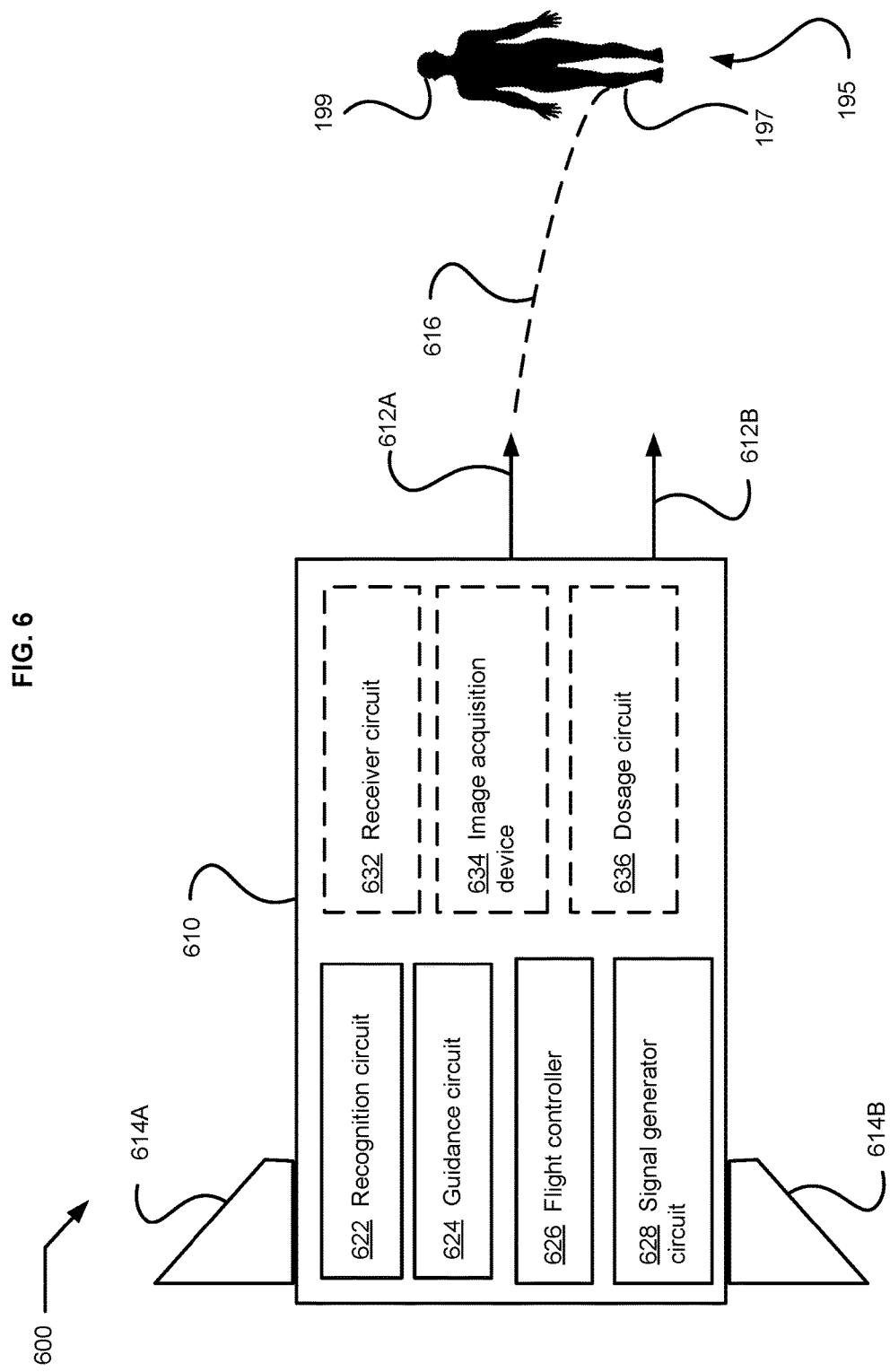

ELECTRO-SHOCK PROJECTILE LAUNCHER

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None.

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

For example, and without limitation, an embodiment of the subject matter described herein includes an electro-shock projectile launcher. The electro-shock projectile launcher includes a deployment tube configured to launch an electro-shock projectile toward a target human. The launcher includes a recognition circuit configured to recognize a body portion of the target human authorized for administration of a selected electric shock by electro-shock projectiles. The launcher includes a guidance circuit configured to determine a flight path of the electro-shock projectile from the deployment tube to the recognized body portion of the target human. The launcher includes an activator circuit configured to initiate a launch from the deployment tube of the electro-shock projectile along the determined flight path in response a received authorization.

In an embodiment, the launcher includes a field interchangeable structure that includes the deployment tube. In an embodiment, the launcher includes a structure configured to be mounted on a vehicle, building, or object. In an embodiment, the launcher includes a handheld structure that includes the electro-shock projectile launcher. In an embodiment, the launcher includes a library of at least one human body portion authorized for administration of the selected electric shock by electro-shock projectiles stored on a non-transitory computer readable media. In an embodiment, the launcher includes an image acquisition device configured to capture an image of at least a portion of the target human. In an embodiment, the launcher includes a target pointer beam configured to illuminate at least a portion of the target human. In an embodiment, the launcher includes an image acquisition device configured to capture an image of at least a portion of the target human illuminated by a target pointer beam. In an embodiment, the launcher includes a signal generator configured to output a selected electric shock to a conductive filament electrically coupled with a tethered electro-shock projectile and through projectile-contacted tissue of the target human. The electric shock is selected to inhibit voluntary movement by the target human. In an embodiment, the launcher includes a signal generator configured to output a selected electric shock to a conductive tip of the electro-shock projectile and through tissue of the target human contacted by the electro-shock projectile. The electric shock is selected to inhibit voluntary movement by the target human. In an embodiment, the launcher includes a dosage circuit configured to select an electric shock that inhibits voluntary movement by the target human but does not exceed a safety standard for the recognized body portion of the human target. In an embodiment, the launcher includes a signal generator configured to output the selected electric shock to a conductive tip of the electro-shock projectile and through tissue of the target human contacted by the electro-shock projectile. In an embodiment, the launcher includes a launch safety circuit configured to emit a human perceivable signal if a condition is not met. In an embodiment, the launcher includes a launch safety circuit configured to prevent a launch of the electro-shock projectile from the electro-shock projectile launcher if a condition is not met. In an embodiment, the launcher includes a fail-safe circuit configured to prevent a discharge of an electrical shock into a projectile-contacted tissue of the target human if the electro-shock projectile-contacted tissue is a body portion not authorized for tissue contact.

For example, and without limitation, an embodiment of the subject matter described herein includes a method. The method includes targeting a human for an administration of a selected electric shock by an electro-shock projectile. The electric shock selected to inhibit voluntary movement by the target human without exceeding a safety standard for the recognized body portion of the human target. The method includes recognizing a body portion of the target human as authorized for administration of the selected electric shock by electro-shock projectiles. The method includes determining a flight path of the electro-shock projectile from a deployment tube of an electro-shock projectile launcher to the recognized body portion of the target human. The method includes initiating a launch of the electro-shock projectile from the deployment tube and along the determined flight path in response a received authorization.

In an embodiment, the method includes capturing an image of the target human; and wherein the recognizing includes recognizing in the captured image at least one body portion of the target human authorized for administration of the selected electric shock by electro-shock projectiles. In an embodiment, the method includes outputting the selected electric shock through tissue of the target human contacted by the electro-shock projectile, the electric shock selected to inhibit voluntary movement by the target human. In an embodiment, the method includes selecting the electric shock to have an excitation voltage, current, or duration parameter responsive to a safe tolerance level of the recognized target human body portion while inhibiting voluntary movement by the target human.

For example, and without limitation, an embodiment of the subject matter described herein includes an electro-shock projectile launcher. The electro-shock projectile launcher includes at least two deployment tubes, each deployment tube configured to launch a respective electro-shock projectile toward a target human. The launcher includes a recognition circuit configured to recognize a body portion of the target human authorized for administration of a selected electric shock by electro-shock projectiles launched from respective deployment tubes of the at least two deployment tubes. The electric shock selected to inhibit voluntary movement by the target human. The launcher includes a guidance circuit configured to determine a first flight path of a first electro-shock projectile from a first deployment tube to the recognized body portion of the target human, and to determine a second flight path of a second electro-shock projectile from a second deployment tube to the recognized body portion of the target human. The launcher includes an activator circuit configured to initiate in response to a received authorization a launch from the first deployment tube of the first electro-shock projectile along the first determined flight path and a launch of the second electro-shock projectile from the second deployment tube along the second determined flight path.

In an embodiment, the launcher includes a signal generator configured to apply the selected electric shock across a first conductive electrode tip of the first electro-shock projectile in contact with the tissue of the target human at a first contact point and a second conductive electrode tip of the second electro-shock projectile in contact with the tissue of the target human at a second contact point. In an embodiment, the launcher includes a handheld structure that includes the electro-shock projectile launcher.

For example, and without limitation, an embodiment of the subject matter described herein includes a system. The system includes means for targeting a human to be administered a selected electric shock by an electro-shock projectile, the electric shock selected to inhibit voluntary movement by the target human without exceeding a safety standard for the recognized body portion of the human target. The system includes means for recognizing a body portion of the target human authorized for administration of the selected electric shock by electro-shock projectiles. The system includes means for determining a flight path of the electro-shock projectile from a deployment tube of an electro-shock projectile launcher to the recognized body portion of the target human. The system includes means for initiating a launch of the electro-shock projectile from the deployment tube and along the determined flight path in response a received authorization.

In an embodiment, the system includes means for capturing an image of at least a portion of the target human; and wherein the means for recognizing includes means for recognizing in the captured image at least one body portion of the target human authorized for administration of the selected electric shock by electro-shock projectiles. In an embodiment, the system includes means for outputting the selected electric shock through electrode-contacted tissue of the target human. In an embodiment, the system includes means for selecting the electric shock to have an excitation voltage, current, or duration parameter responsive to a safe tolerance level of the recognized target human body portion while inhibiting voluntary movement by the target human.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 5 illustrates an example system;

FIG. 6 illustrates an environment that includes the target human and a steerable electro-shock projectile;

DETAILED DESCRIPTION

Figure 1:
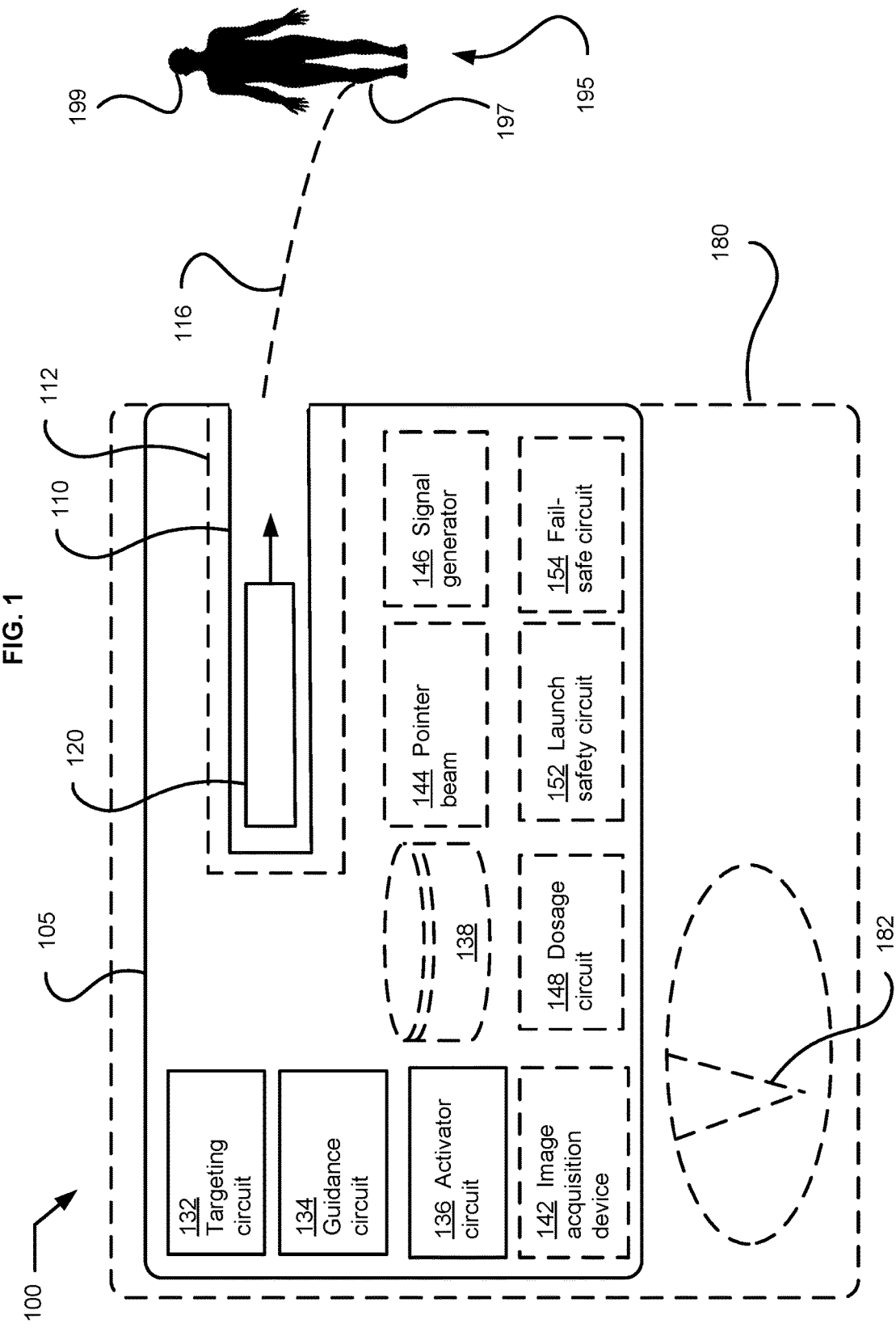
FIG. 1 schematically illustrates an example environment in which embodiments may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

This application makes reference to technologies described more fully in U.S. patent application Ser. No. 15/252,461, TRAJECTORY-CONTROLLED ELECTRO-SHOCK PROJECTILES, Roderick A. Hyde et al. as inventors, filed on Aug. 31, 2016, is related to the present application. That application is incorporated by reference herein, including any subject matter included by reference in that application.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various implementations by which processes and/or systems and/or other technologies described herein can be effected (e.g., hardware, software, and/or firmware), and that the preferred implementation will vary with the context in which the processes and/or systems and/or other technologies are deployed. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Hence, there are several possible implementations by which the processes and/or devices and/or other technologies described herein may be effected, none of which is inherently superior to the other in that any implementation to be utilized is a choice dependent upon the context in which the implementation will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to implement an operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, module, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "circuitry" or "electrical circuitry." Consequently, as used herein "circuitry" or "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will further recognize that at least a portion of the devices and/or processes described herein can be integrated into an image processing system. A typical image processing system may generally include one or more of a system unit housing, a video display device, memory such as volatile or non-volatile memory, processors such as microprocessors or digital signal processors, computational entities such as operating systems, drivers, applications programs, one or more interaction devices, control systems including feedback loops and control motors. An image processing system may be implemented utilizing suitable commercially available components, such as those typically found in digital still systems and/or digital motion systems.

Computer-readable media may include any media that can be accessed by a computing device and include non-transitory media, both volatile and nonvolatile media, and removable and non-removable media. By way of example, and not of limitation, computer-readable media may include computer storage media. Computer storage media includes non-volatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, or atomic quantum memory. Combinations of any of the above may also be included within the scope of computer-readable media.

In certain instances, one or more elements of a disclosed embodiment may be deemed not necessary and omitted. In other instances, one or more other elements of a disclosed embodiment may be deemed necessary and added.

FIG. 1 schematically illustrates an example environment 100 in which embodiments may be implemented. The environment includes a target human 195 and an electro-shock projectile launcher 105. The electro-shock projectile launcher includes a deployment tube 110 configured to launch an electro-shock projectile 120 toward the target human. The electro-shock projectile launcher includes a targeting circuit 132 configured to recognize a body portion or a body part (hereafter referred to as "body portion" 197) of the target human authorized for administration of a selected electric shock by electro-shock projectiles. In an embodiment, the targeting circuit is configured to recognize a body portion of the target human as authorized for administration of a selected electric shock by electro-shock projectiles. In an embodiment, the targeting circuit is configured to recognize a body portion of the target human as authorized for tissue contact by the electro-shock projectile and administration of the selected electric shock by electro-shock projectiles. In an embodiment, the tissue contact includes a tissue impact or a tissue penetration. In an embodiment, the electro-shock projectile launcher includes a deployment tube 110 configured to launch a conducted electro-shock projectile 120 toward the target human, the conducted electro-shock projectile electrically coupled with the launcher by an electrically conductive tether.

The electro-shock projectile launcher 105 includes a guidance circuit 134 configured to determine a flight path 116 of the electro-shock projectile 120 from the deployment tube 110 to the recognized body portion of the target human. In an embodiment, the flight path determination may be responsive to pointing or aimed direction of the deployment tube, a motion of the deployment tube, or distance from the deployment tube to the target human 195. In an embodiment, the flight path determination may be responsive to known projectile flight dispersion. The electro-shock projectile launcher includes an activator circuit 136 configured to initiate a launch from the deployment tube of the electro-shock projectile along the determined flight path in response a received authorization. In an embodiment, the received authorization includes an authorization received from a person holding the electro-shock projectile launcher. For example, the authorization may be generated by the person pulling a trigger 182 of a handheld structure 180. For example, the authorization may be generated by the person speaking a voice recognized command. In an embodiment, the received authorization includes an authorization received from a machine. For example, the machine may include an intruder security system. In an embodiment, the electro-shock projectile launcher is a conducted electro-shock projectile launcher.

In an embodiment, the activator circuit 136 is configured to record the time when the launch of the projectile is activated. In an embodiment, data indicative of the time when the launch of the projectile is activated and indicative of a time when the recognition circuit recognizes the body portion of the target human authorized for administration of a selected electric shock by electro-shock projectiles are stored in an association in a non-volatile computer readable media. In an embodiment, the deployment tube 110 includes an aimable deployment tube configured to launch the electro-shock projectile 120 along a flight path 116 selected from at least different two flight paths. In an embodiment, the aimable deployment tube is configured to be aimed independently of an orientation of the handheld structure 180 that includes electro-shock projectile launcher 105. In an embodiment, the aimable deployment tube is configured to be aimed along one axis. In an embodiment, the aimable deployment tube is configured to be aimed along two axes.

In an embodiment, the deployment tube 110 is configured to adjust at least one directional control surface of the electro-shock projectile in response to the determined flight path 116. For example, a directional control surface may include an air deflecting surface or fin. An air deflecting surface or fin is illustrated in FIG. 6 by an air deflecting surface or fin 614A or fin 614B. In an embodiment, the deployment tube is configured to deflect the electro-shock projectile as it departs the deployment tube in response to the determined flight path to direct the electro-shock projectile in the flight path toward the target human body portion. For example, the deflection may be implemented by an air deflecting surface. In an embodiment, the deployment tube is configured to deflect the electro-shock projectile as it departs the deployment tube in response to the determined flight path. For example, the deflection may be done by deflecting the projectile as it leaves the deployment tube.

In an embodiment, the electro-shock projectile 120 is configured to administer an electric shock into tissue of the target human 195 at a contact point. The administered electric shock inhibiting voluntary movement or locomotion by the target human. In an embodiment, the electro-shock projectile is configured to administer an electric shock into tissue of the target human at a contact point either alone or in cooperation with one or more other electro-shock projectiles. In an embodiment, the electro-shock projectile is configured to administer an electric shock into tissue of the target human upon impacting the target human. In an embodiment, the body portion 197 of the target human 195 authorized for administration of the selected electric shock by electro-shock projectiles includes a back, lower torso, pelvis, hip, arm, legs, or foot. In an embodiment, the target human body portion authorized for administration of the selected electric shock by electro-shock projectiles does not include a thorax, upper torso, or head portion of the target human. In an embodiment, an unauthorized or not-authorized body portion of the target human is illustrated by the head 199 of the target human.

In an embodiment, the electro-shock projectile launcher 105 includes a field interchangeable structure 112 that includes the deployment tube 110. In an embodiment, the field interchangeable structure includes the electro-shock projectile 120 preloaded in the deployment tube. In an embodiment, the electro-shock projectile launcher 105 includes a structure configured to be mounted on a vehicle, building, or object. In an embodiment, the electro-shock projectile launcher is aimable. In an embodiment, the handheld structure 180 includes the electro-shock projectile launcher. In an embodiment, the handheld structure is aimable by a person holding the handheld structure. In an embodiment, the electro-shock projectile launcher includes a library 138 of at least one human body portion authorized for administration of the selected electric shock by electro-shock projectiles stored on a non-transitory computer readable media. In an embodiment, the library further includes at least one human body portion not authorized for administration of the selected electric shock by electro-shock projectiles, illustrated as the head 199.

In an embodiment, the electro-shock projectile launcher 105 includes an image acquisition device 142 configured to capture an image of at least a portion of the target human 195. For example, the image acquisition device may include a digital camera, CCD array, sonic or ultrasonic image capture device, or other sensor. In an embodiment, the image acquisition device is further configured to capture the image of at least a portion of the target human proximate in time to an initiation of a launch by the activator circuit 136. In an embodiment, the image acquisition device is further configured to capture the image of at least a portion of the target human and record a time of an initiation of a launch by the activator circuit. In an embodiment, the targeting circuit 132 is configured to recognize the target human body portion 197 authorized for administration of the selected electric shock in an image that includes at least a portion of the target human.

In an embodiment, the electro-shock projectile launcher 105 includes a target pointer beam 144 configured to illuminate at least a portion of the target human 195. For example, the target pointer beam may include a visible or IR laser light beam. In an embodiment, the electro-shock projectile launcher includes the image acquisition device 142 configured to capture an image of at least a portion of the target human illuminated by a target pointer beam. In an embodiment, the image acquisition device is further configured to capture the image of at least a portion of the target human proximate in time to an initiation of a launch by the activator circuit. In an embodiment, the targeting circuit 132 is configured to recognize in the captured image at least one body portion 197 of the target human 195 authorized for administration of the selected electric shock by electro-shock projectiles. In an embodiment, the targeting circuit is configured to recognize in the captured image at least one body portion of the target human not authorized 199 for administration of the selected electric shock by the electro-shock projectile.

In an embodiment of the electro-shock projectile launcher 105, the electro-shock projectile 120 includes a tethered electro-shock projectile. An embodiment of a tethered electro-shock projectile is described in M. Hanchett, Electrode for electronic weaponry that dissipates kinetic energy, Pub. No. US 20160010956 (Jan. 14, 2016). An embodiment of a tethered electro-shock projectile is described in T. Beechey, et al., Electronic for electronic weaponry and methods of manufacture, Pub. No. US 20140293499 (Oct. 2, 2014). An embodiment of a tethered electro-shock projectile is described in M. Hanchett, et al., Systems and method for electrodes and coupling structures for electronic weaponry, Pub. No. 20140153153 (Jan. 5, 2014). An embodiment of a tethered electro-shock projectile is described in M. Cerovic, et al., Systems and method for deploying electrodes from a covered cavity for electronic weaponry, Pub. No. US 20070297116 (Dec. 27, 2007).

In an embodiment, the electro-shock projectile launcher 105 includes a signal generator 146 configured to output a selected electric shock or stimulus to a conductive filament electrically coupled with a tethered electro-shock projectile 120 and through projectile-contacted tissue of the target human 195. The electric shock selected to inhibit voluntary movement by the target human. In an embodiment, the electro-shock projectile launcher includes the conductive filament electrically coupled between the signal generator and the electro-shock projectile. In an embodiment, the electric shock is selected to have an excitation voltage, current, or duration parameter responsive to a safe tolerance level of the recognized target human body portion while inhibiting voluntary movement by the target human. For example, the electric shock may have an adjusted excitation voltage, current, or duration based on a tissue contact or penetration site. For example, the electric shock may apply more excitation in some sites, such as thigh or lower legs than in other sites, such as arms.

In an embodiment, the electro-shock projectile 120 includes a signal generator 146 configured to output a selected electric shock to a conductive tip of the electro-shock projectile and through tissue of the target human 195 contacted by the electro-shock projectile. The electric shock selected to inhibit voluntary movement by the target human.

In an embodiment, the electro-shock projectile launcher 105 includes a dosage circuit 148 configured to select an electric shock that inhibits voluntary movement by the target human 195 but does not exceed a safety standard for the recognized body portion of the human target. An embodiment of selecting electric shock parameter is described in P. Smith, et al., Systems and method for immobilization using charge delivery, Pub. No. 20060256498 (Nov. 16, 2006). In an embodiment, the electro-shock projectile launcher a signal generator 146 configured to output the selected electric shock to a conductive tip of the electro-shock projectile and through tissue of the target human contacted by the electro-shock projectile.

In an embodiment, the deployment tube 110 includes a field interchangeable deployment tube preloaded with the electro-shock projectile 120. In an embodiment, the guidance circuit 134 is further configured to adjust inflight at least one directional control surface of the electro-shock projectile to direct the electro-shock projectile along the determined flight path. In an embodiment, the targeting circuit 132 is further configured to emit a human perceivable signal in response to a recognition of the body portion 197 authorized for tissue contact. For example, the human perceivable signal may include a sound, light, haptic signal.

In an embodiment, the electro-shock projectile launcher 105 includes a launch safety circuit 152 configured to emit a human perceivable signal if a condition is not met. For example, the human perceivable signal may include a sound, light, or haptic signal. In an embodiment, the electro-shock projectile launcher 105 includes the launch safety circuit 152 configured to prevent a launch of the electro-shock projectile 120 from the electro-shock projectile launcher if a condition is not met. In an embodiment, the condition is not met if the targeting circuit fails to recognize at least one body portion 197 of the target human authorized for administration of the selected electric shock by the electro-shock projectile. For example, the condition may not be met if a predicted impact point of the electro-shock projectile is the head 199, upper torso, or other non-authorized predicted impact point on the human target. In an embodiment, the condition is not met if the guidance circuit 134 determines that a likelihood of the electronic projectile successfully contacting the recognized body portion of the target human is less than a specified value. For example, a specified value of the likelihood may be a 75%, 50%, or 30% likelihood of the electronic projectile successfully contacting the recognized body portion of the target human. For example, the likelihood may be responsive to a motion of the deployment tube or the human target, an excessive distance to the human target, or a high projectile dispersion relative to the size of the human target.

In an embodiment, the electro-shock projectile launcher 105 includes a fail-safe circuit 154 configured to prevent a discharge of an electrical shock into the target human 195 if the electro-shock projectile-contacted-tissue is a body portion not authorized 199 for administration of the selected electric shock. For example, a body portion of the target human not authorized for administration of the selected electric shock may include a body portion of the target human that is not recognized by the recognition circuit. In an embodiment, the fail-safe circuit configured to prevent a discharge of an electrical shock into projectile-contacted tissue of the target human if the electro-shock projectile-contacted tissue is in a body portion of the target human that is disapproved for tissue contact. For example, a body portion of the target human not authorized for administration of the selected electric shock in a database. For example, the database may be stored on a non-volatile computer readable medium accessible by the electro-shock projectile launcher.

Figure 2:
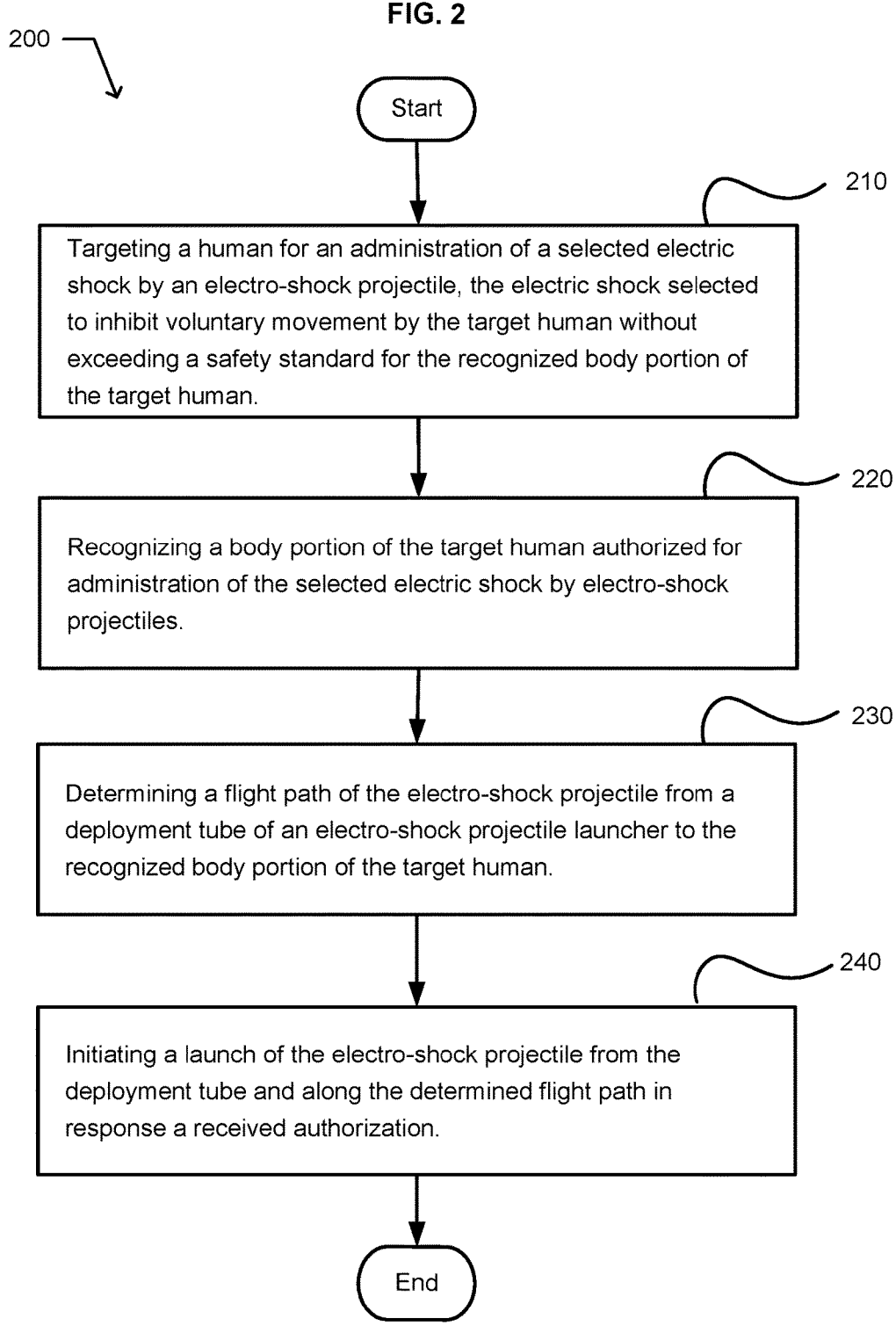
FIG. 2 illustrates an example operational flow.

FIG. 2 illustrates an example operational flow 200. After a start operation, the operational flow includes an aiming operation 210. The aiming operation includes targeting a human for an administration of a selected electric shock by electro-shock projectile. The electric shock is selected to inhibit voluntary movement by the target human without exceeding a safety standard for the recognized body portion of the target human. In an embodiment, the aiming operation may be implemented using the targeting circuit 132 as described in conjunction with FIG. 1. A validation operation 220 includes recognizing a body portion of the target human as authorized for administration of the selected electric shock by electro-shock projectiles. In an embodiment, the validation operation may be implemented using the targeting circuit 132 described in conjunction with FIG. 2. A guidance operation 230 includes determining a flight path of the electro-shock projectile from a deployment tube of an electro-shock projectile launcher to the recognized body portion of the target human. In an embodiment, the guidance operation may be implemented using the guidance circuit 134 described in conjunction with FIG. 2. An activation operation 240 includes initiating a launch of the electro-shock projectile from the deployment tube and along the determined flight path in response a received authorization. In an embodiment, the activation operation may be implemented using the activator circuit 136 described in conjunction with FIG. 1. The operational flow includes an end operation.

In an embodiment of the validation operation 220, the recognizing includes recognizing a body portion of the target human authorized for administration of the selected electric shock by electro-shock projectiles in response to a library stored on a non-transitory computer readable media. The library including at least two body portions of humans authorized for administration of the selected electric shock by electro-shock projectiles. In an embodiment, the library includes at least one body portion of humans not authorized for administration of the selected electric shock by electro-shock projectiles. In an embodiment, the library includes at least one body portion of humans unauthorized for administration of the selected electric shock by electro-shock projectiles. In an embodiment, the aiming operation 210 further includes illuminating the target human with a target pointer beam. In an embodiment, the validation operation includes recognizing the target human body portion authorized for administration of the selected electric shock in an image of at least a portion of the target human acquired in real time. In an embodiment, the guidance operation 230 includes determining an alignment of the deployment tube implementing or facilitating a launch of the electro-shock projectile along the determined flight path.

Figure 3:
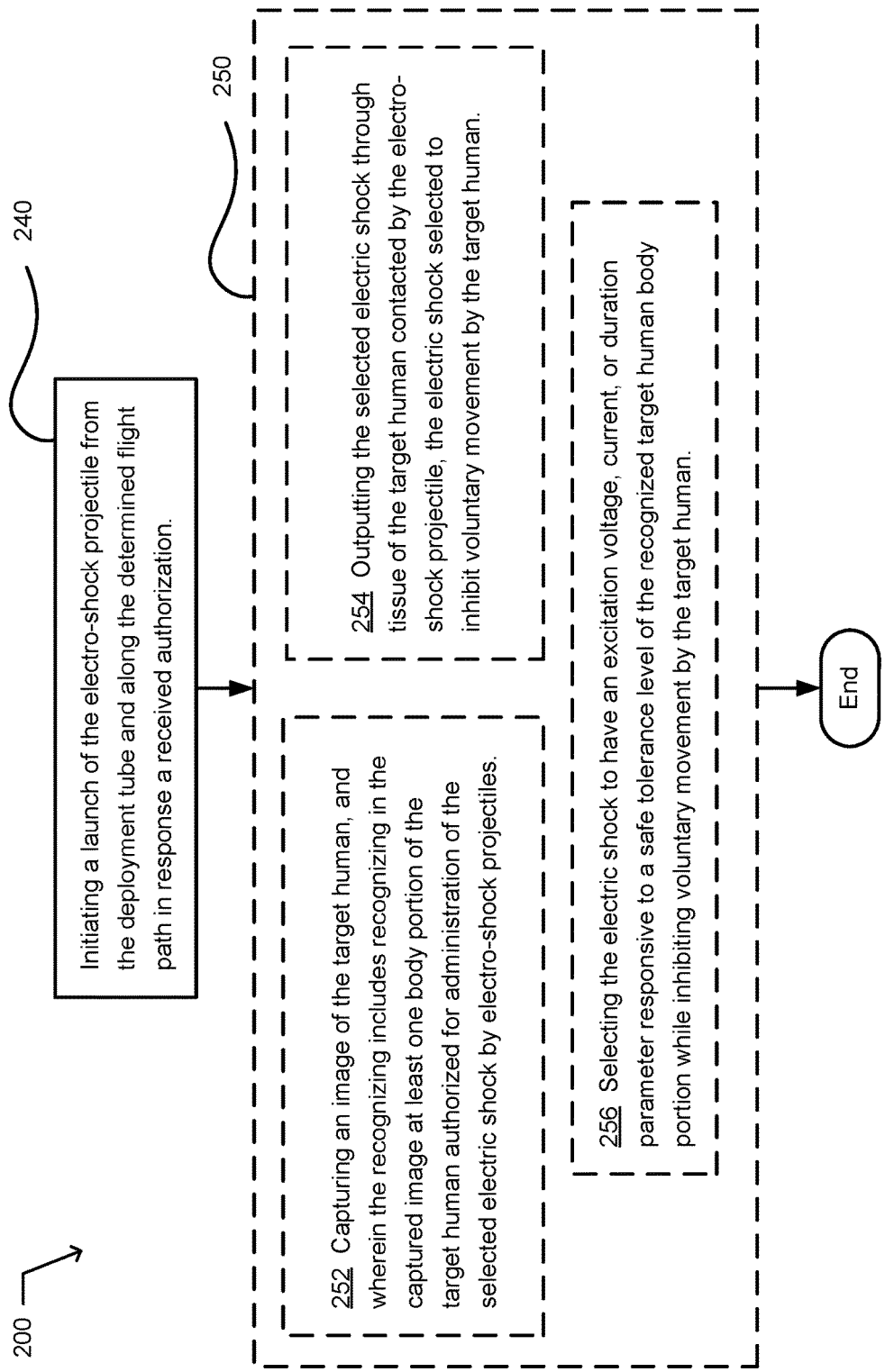
FIG. 3 illustrates an embodiment of the operational flow described in conjunction with FIG. 2.

FIG. 3 illustrates an embodiment of the operational flow 200 described in conjunction with FIG. 2. In the embodiment, the operational flow may include at least one additional operation 250. An additional operation 252 includes capturing an image of the target human. In the operation 252, the recognizing of the validation operation 220 includes recognizing in the captured image at least one body portion of the target human authorized for administration of the selected electric shock by electro-shock projectiles. In an embodiment, the operation 252 includes capturing an image of the target human illuminated by a target pointer beam. An additional operation 254 includes outputting the selected electric shock through tissue of the target human contacted by the electro-shock projectile, the electric shock selected to inhibit voluntary movement by the target human. In an embodiment, the outputting includes outputting the selected electric shock to a conductive filament electrically coupled with a tethered electro-shock projectile and through tissue of the target human contacted by the electro-shock projectile. An additional operation 256 includes selecting the electric shock to have an excitation voltage, current, or duration parameter responsive to a safe tolerance level of the recognized target human body portion while inhibiting voluntary movement by the target human.

Figure 4:
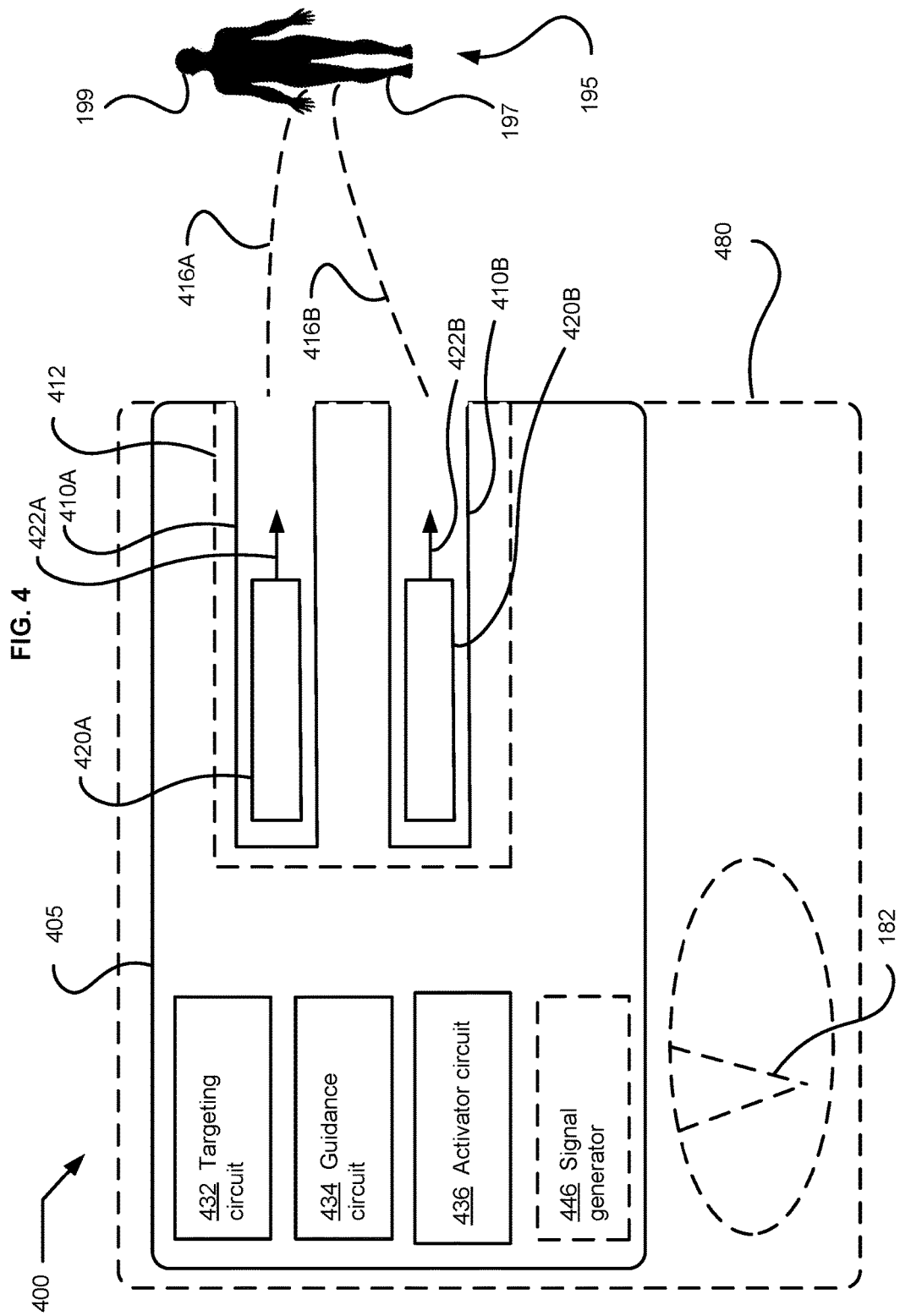
FIG. 4 illustrates an environment that includes the target human and an electro-shock projectile launcher.

FIG. 4 illustrates an environment 400 that includes the target human 195 and an electro-shock projectile launcher 405. The electro-shock projectile launcher includes at least two deployment tubes 410, illustrated by a first deployment tube 410A and a second deployment tube 410B. Each deployment tube is configured to launch a respective electro-shock projectile, illustrated by a first electro-shock projectile 420A and a second electro-shock projectile 420B, toward the target human. The electro-shock projectile launcher includes a targeting circuit 432 configured to recognize a body portion of the target human authorized for administration 197 of a selected electric shock by at least two electro-shock projectiles launched from respective deployment tubes of the at least two deployment tubes. The electric shock is selected to inhibit voluntary movement by the target human. The electro-shock projectile launcher includes a guidance circuit 434 configured to determine a first flight path 416A of the first electro-shock projectile from the first deployment tube to the recognized body portion of the target human, and to determine a second flight path 416B of the second electro-shock projectile 420B from the second deployment tube to the recognized body portion of the target human. In an embodiment, the guidance circuit is configured to determine a first flight path of a first electro-shock projectile from a first deployment tube to a first contact point on the recognized body portion of the target human, and to determine a second flight path of a second electro-shock projectile from a second deployment tube to a second contact point on the recognized body portion of the target human. In an embodiment, the first and second body portions can be the same body portion. For example, both may be the right thigh of the target human. In an embodiment, the first and second body portions can be different body portions. For example, the first body portion may be the right buttock and the second body portion may be the left buttock. The electro-shock projectile launcher includes an activator circuit 436 configured to initiate in response to a received authorization a launch from the first deployment tube of the first electro-shock projectile along the first determined flight path and a launch of the second electro-shock projectile from the second deployment tube along the second determined flight path. In an embodiment, the received authorization includes an authorization received from a person holding the electro-shock projectile launcher. For example, the authorization may be generated by the person pulling a trigger 182 of a handheld structure 480. For example, the authorization may be generated by the person speaking a voice recognized command. In an embodiment, the received authorization includes an authorization received from a machine. For example, the machine may include an intruder security system.

In an embodiment, the first deployment tube 410A of the at least two deployment tubes 410 includes a first aimable deployment tube 410A configured to launch the first electro-shock projectile 420A along a selected first flight path 416A of at least two different first flight paths. In an embodiment, the second deployment tube 410B of the at least two deployment tubes includes a second aimable deployment tube configured to launch the second electro-shock projectile 420B along a selected second flight path 416B of at least two different second flight paths. In an embodiment, the first deployment tube of the at least two deployment tubes is configured to adjust at least one directional control surface of the first electro-shock projectile in response to the first determined flight path. For example, a directional control surface may include an air deflecting surface or fin. An air deflecting surface or fin is illustrated in FIG. 6 by air deflecting surface or fin 614A. In an embodiment, the first deployment tube of the at least two deployment tubes is configured to adjust at least one directional control surface of the first electro-shock projectile in response to the first determined flight path to direct the electro-shock projectile in the flight path toward the target human body portion. In an embodiment, the second deployment tube of the at least two deployment tubes is configured to adjust at least one directional control surface of the second electro-shock projectile in response to the second determined flight path. In an embodiment, the first deployment tube of the at least two deployment tubes is configured to deflect the first electro-shock projectile in response to the first determined flight path as it departs the first deployment tube. In an embodiment, the first deployment tube is configured to deflect the first electro-shock projectile as it leaves the deployment tube. In an embodiment, the second deployment tube of the at least two deployment tubes is configured to deflect in response to the second determined flight path the second electro-shock projectile as it departs the second deployment tube.

In an embodiment, the electro-shock projectile launcher 405 includes a signal generator 446 configured to apply the selected electric shock across a first conductive electrode tip 422A of the first electro-shock projectile 420A in contact with the tissue of the target human 195 at a first contact point and a second conductive electrode tip 422B of the second electro-shock projectile 420B in contact with the tissue of the target human at a second contact point. In an embodiment, the first deployment tube 410A of the at least two deployment tubes 410 is configured to launch a first tethered electro-shock projectile 420A and a second deployment tube 410B of the at least two deployment tubes is configured to launch a second tethered electro-shock projectile 420B. In an embodiment, the first tethered electro-shock projectile includes a signal generator, such as the signal generator 446, configured to apply the selected electric shock to the tissue of the target human at a first contact point and to the tissue of the target animal at a second contact point.

In an embodiment, the electro-shock projectile launcher 405 includes a field interchangeable structure 412 that includes the at least two deployment tubes 410, illustrated as the deployment tube 410A and the deployment tube 410B. In an embodiment, the field interchangeable structure includes an electro-shock projectile respectively preloaded in each deployment tube, illustrated as the first electro-shock projectile 420A and the second electro-shock projectile 420B. Each deployment tube of the at least two deployment tubes is configured to launch a respective electro-shock projectile. In an embodiment, the electro-shock projectile launcher includes a handheld structure 480 that includes the electro-shock projectile launcher. In an embodiment, the handheld structure includes an aimable handheld structure.

In an embodiment, the electro-shock projectile launcher 405 may include a the library 138 of at least one human body portion authorized for administration of the selected electric shock by electro-shock projectiles stored on a non-transitory computer readable media described in conjunction with FIG. 1. In an embodiment, the electro-shock projectile launcher may include the image acquisition device 142 described in conjunction with FIG. 1. In an embodiment, the electro-shock projectile launcher may include the target pointer beam 144 described in conjunction with FIG. 1. In an embodiment, the electro-shock projectile launcher may include signal generator 146 as described in conjunction with FIG. 1. In an embodiment, the electro-shock projectile launcher may include the dosage circuit 148 described in conjunction with FIG. 1. In an embodiment, the electro-shock projectile launcher may include launch safety circuit 152 as described in conjunction with FIG. 1. In an embodiment, the electro-shock projectile launcher may include the fail-safe circuit described in conjunction with FIG. 1.

FIG. 5 illustrates an example system 500. The system includes means for targeting a human to be administered a selected electric shock by an electro-shock projectile. The electric shock is selected to inhibit voluntary movement by the target human without exceeding a safety standard for the recognized body portion of the human target. The system includes means for recognizing 520 a body portion of the target human authorized for administration of the selected electric shock by electro-shock projectiles. The system includes means for determining 530 a flight path of the electro-shock projectile from a deployment tube of an electro-shock projectile launcher to the recognized body portion of the target human. The system includes means for initiating 540 a launch of the electro-shock projectile from the deployment tube and along the determined flight path in response a received authorization. In an embodiment, the received authorization may include a human initiated authorization or a machine initiated authorization.

In an embodiment, the system includes means for capturing 550 an image of at least a portion of the target human; and the means for recognizing 520 includes recognizing in the captured image at least one body portion of the target human authorized for administration of the selected electric shock by electro-shock projectiles. In an embodiment, the system includes means for outputting 560 the selected electric shock through electrode-contacted tissue of the target human. In an embodiment, the system includes means for selecting 570 the electric shock to have an excitation voltage, current, or duration parameter responsive to a safe tolerance level of the recognized target human body portion while inhibiting voluntary movement by the target human.

FIG. 6 illustrates an environment 600 that includes the target human 195 and a steerable electro-shock projectile 610. The steerable electro-shock projectile includes a recognition circuit 622 configured to recognize a body portion of the target human authorized for administration 197 of a selected electric shock by electro-shock projectiles. The steerable electro-shock projectile includes a conductive electrode tip 612A configured to administer the selected electric shock to the recognized body portion of the target human. The electric shock selected to inhibit voluntary movement by the target human. The steerable electro-shock projectile includes a guidance circuit 624 configured to generate instructions directing the electro-shock projectile along a flight path 616 toward the recognized body portion of the target human. The steerable electro-shock projectile includes a flight controller 626 configured to operate a directional control surface in response to the generated instructions. For example, the directional control surface may include an air deflecting surface. For example, an air deflecting surface may include the fin 614A or fin 614B. For example, the directional control surface may include deformable structure or asymmetric surface creating off-axis drag. An embodiment of a directional control surface of a projectile is described in M. Minnicino, Steerable munitions projectile, Pub. No. US 20160033244 (Feb. 4, 2016). An embodiment of a directional control surface of a projectile is described in P. Mallon, et al., Steerable Projectile, U.S. Pat. No. 8,719,639 (May 6, 2014). An embodiment of a directional control surface of a projectile is described in J. Jones et al., Small caliber guided projectile, U.S. Pat. No. 7,781,709 (Aug. 24, 2010). In an embodiment, the flight controller is configured to operate a directional control surface in response to the generated instructions steering electro-shock projectile along the flight path to the recognized body portion of the target human. In an embodiment, the steerable electro-shock projectile includes a signal generator 628 configured to output the selected electric shock to the conductive electrode tip and through tissue of the target human contacted by the conductive electrode tip.

In an embodiment, the steerable electro-shock projectile 610 includes a receiver circuit 632 configured to receive information indicative of the flight path 616 to the recognized body portion of the target human 195. In an embodiment, the flight path may be received from a system or a device configured to launch the steerable electro-shock projectile. In an embodiment, the flight path may be received wirelessly or over a tether from a device configured to launch the steerable electro-shock projectile. In an embodiment, the flight path may be received wirelessly or over a tether from an airborne vehicle, such as a manned aircraft or drone. In an embodiment, the flight path may be received from another electro-shock projectile.

In an embodiment, the guidance circuit 624 is further configured to determine the flight path 616 to the recognized body portion of the target human 195. In an embodiment, the guidance circuit is further configured to determine the flight path to the recognized body portion of the target human in response to an illumination reflected from the target human. For example, the illumination may be provided by a target pointer beam configured to illuminate at least a portion of the target human. In an embodiment, the steerable electro-shock projectile 610 further includes an illumination source configured to deliver illumination to the target human. In an embodiment, the steerable electro-shock projectile further includes a sensor configured to receive illumination reflected from the target human. In an embodiment, the sensor is configured to determine directional information to the target human from the received illumination. In an embodiment, the guidance circuit is further configured to (i) recognize in an image of the target human a body portion authorized for administration 197 of the selected electric shock by the conductive electrode tip; (ii) determine a flight path to the recognized body portion; and (iii) generate the instructions steering the electro-shock projectile along the determined flight path. In an embodiment, guidance circuit is configured to (i) recognize in an image an illuminated target human.

In an embodiment, the steerable electro-shock projectile 610 includes an image acquisition device 634 configured to capture an image of at least a portion of the target human 195. In an embodiment, the image acquisition device is configured to capture an image of at least a portion of the target human illuminated by a target pointer beam. In an embodiment, the image acquisition device configured to detect an illumination reflected from the target human.

In an embodiment, the steerable electro-shock projectile 610 includes another conductive electrode tip 612B configured to co-administer the selected electric shock to the recognized body portion of the target human 195. The signal generator 628 is configured to apply the selected electric shock across the conductive electrode tip 612A in the tissue of the target human at a contact point and the another conductive electrode tip 612B in the tissue of the target human at another contact point. In an embodiment, the another conductive electrode tip is deployable from the steerable electro-shock projectile. In an embodiment, the electro-shock projectile 610 includes a projectile body configured to be launched by rapidly expanding gas. For example, the rapidly expanding gas may in a launch tube, or by a rocket motor. In an embodiment, the steerable electro-shock projectile includes a dosage circuit 636 configured to select an electric shock that inhibits voluntary movement by the target human but does not exceed a safety standard for the recognized body portion of the human target.

Figure 7:
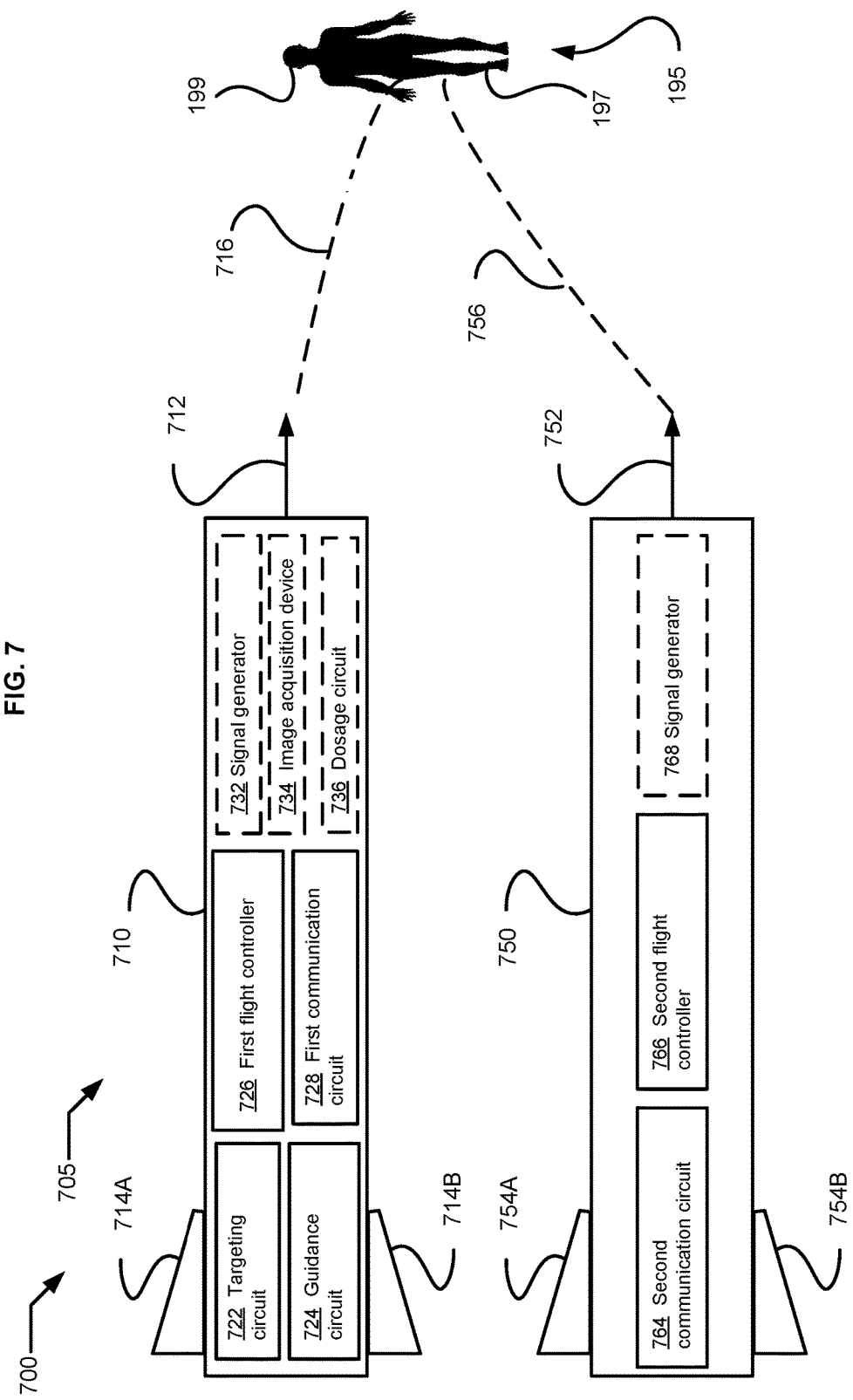
FIG. 7 illustrates an environment that includes the target human and a system.

FIG. 7 illustrates an environment 700 that includes the target human 195 and a system 705. The system includes a first steerable electro-shock projectile 710 and a second steerable electro-shock projectile 750. The first steerable electro-shock projectile includes a targeting circuit 722 configured to recognize the body portion of the human target authorized for administration 197 of a selected electric shock by electro-shock projectiles. The electric shock is selected to inhibit voluntary movement by the target human without exceeding a safety standard for the recognized body portion of the human target. The first steerable electro-shock projectile includes a guidance circuit 724 configured to determine (i) a first flight path 716 directing the first steerable electro-shock projectile to the recognized body portion of the human and (ii) a second flight path 756 directing a second steerable electro-shock projectile 750 to the recognized body portion of the human. The first steerable electro-shock projectile includes a first flight controller 726 configured to steer the first steerable electro-shock projectile along the first flight path using a first directional control surface. For example, the first directional control surface may include an air deflecting surface or fin. An embodiment of a directional control surface is illustrated by air deflecting surface 714A and by air deflecting surface 714B. The first steerable electro-shock projectile includes a first communication circuit 728 configured to transmit the second flight path to the second steerable electro-shock projectile. In an embodiment, the first communication circuit is configured to transmit the second flight path to the second steerable electro-shock projectile wirelessly or by a tether.

The second steerable electro-shock projectile 750 includes a second communication circuit 764 configured to receive second flight path 756 from the first steerable electro-shock projectile 710. The second steerable electro-shock projectile includes a second flight controller 766 configured to steer the second steerable electro-shock projectile along the second flight path using a second directional control surface. For example, the second directional control surface may include an air deflecting surface or fin. An embodiment of the second directional control surface is illustrated by air deflecting surface 754A and by air deflecting surface 754B.

The system 705 includes a signal generator configured to apply the selected electric shock across a first conductive tip 712 of the first steerable electro-shock projectile 705 in contact with the target human 195 at a first contact point and a second conductive electrode tip 752 of the second steerable electro-shock projectile 750 in contact with the target human at a second contact point. In an embodiment, the signal generator is illustrated by a signal generator 732 carried by the first steerable electro-shock projectile 710. In an embodiment, the signal generator is illustrated by a signal generator 768 carried by the second steerable electro-shock projectile 750. In an embodiment, a first portion of the signal generator is carried by the first steerable electro-shock projectile and a second portion is carried by the second steerable electro-shock projectile.

In an embodiment, the targeting circuit 722 is further configured to recognize a body portion of a human target authorized for administration 197 of a selected electric shock by electro-shock projectiles at least partially in response to an illumination reflected from the target human. For example, the illumination may be from a pointer beam configured to illuminate the human target. For example, the pointer beam may be a visible or infrared light beam. In an embodiment, the guidance circuit 724 is further configured to determine the first flight path and the second flight path.

In an embodiment, the first steerable electro-shock projectile 710 includes an image acquisition device 734 configured to capture an image of a portion of the target human. In an embodiment, the first steerable electro-shock projectile includes a first projectile body configured to be launched by rapidly expanding gas. In an embodiment, the second steerable electro-shock projectile 750 includes a first projectile body configured to be launched by rapidly expanding gas. In an embodiment, the first steerable electro-shock projectile includes a first conductive electrode tip 712 configured to conduct the selected electric shock to tissue of the target human 195 at a first contact point. In an embodiment, the second steerable electro-shock projectile includes a second conductive electrode tip 752 configured to conduct the selected electric shock to tissue of the target human at a second contact point.

In an embodiment, the first steerable electro-shock projectile 710 further includes a dosage circuit 736 configured to select an electric shock that inhibits voluntary movement by the target human 195 but does not exceed a safety standard for the recognized body portion of the human target.

In an embodiment, the system 705 includes an electro-shock projectile launcher having a first deployment tube configured to launch the first steerable electro-shock projectile 710 and a second deployment tube configured to launch the second steerable electro-shock projectile 750. For example, see electro-shock projectile launcher 405 described in conjunction with FIG. 4. In an embodiment, the system 705 includes a field interchangeable module configured to be removably mounted on an electro-shock projectile launcher and having a first deployment tube configured to launch the first steerable electro-shock projectile and a second deployment tube configured to launch the second steerable electro-shock projectile.

Figure 8:
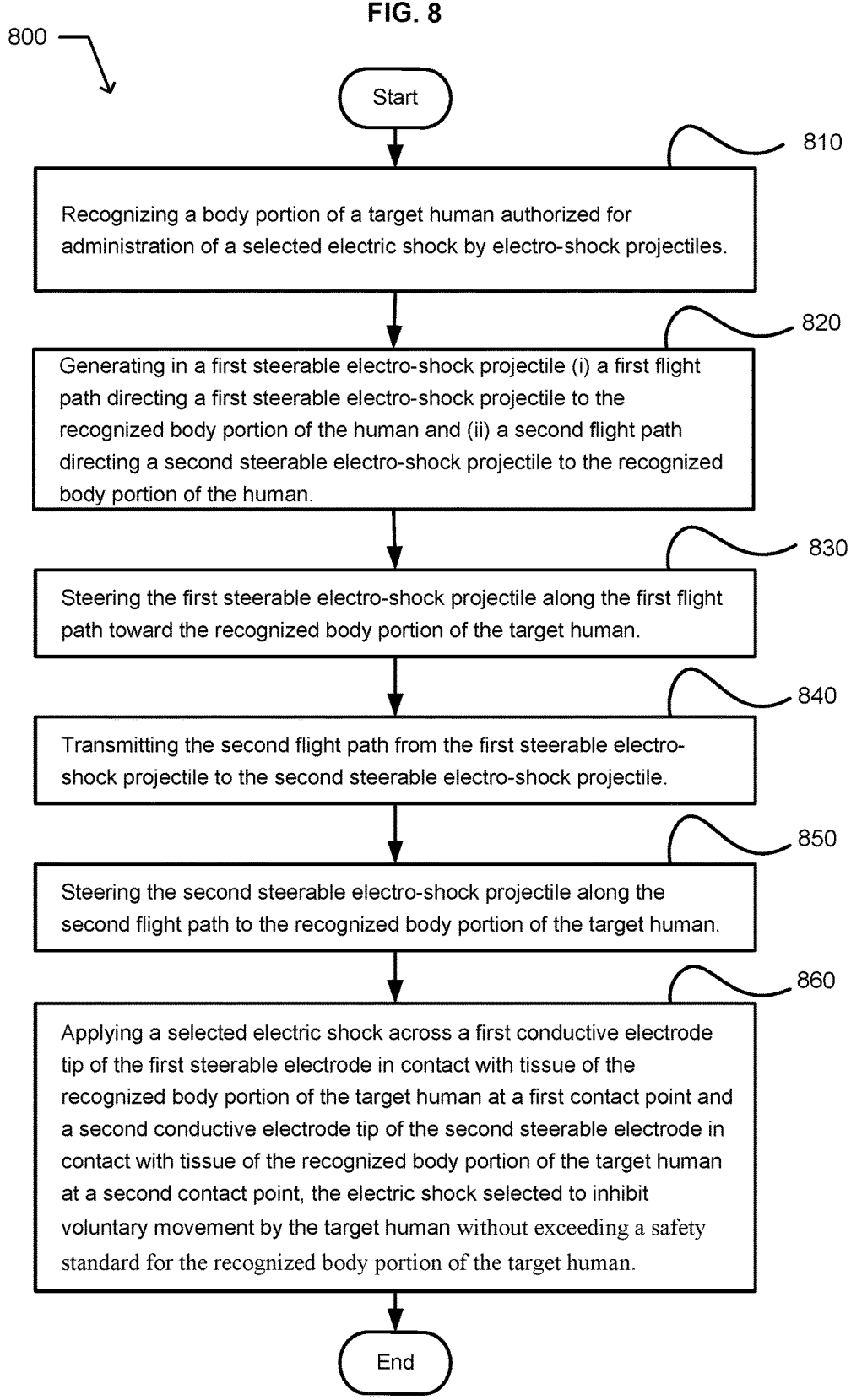
FIG. 8 illustrates an example operational flow.

FIG. 8 illustrates an example operational flow. After a start operation, the operational flow includes a targeting operation 810. The targeting operation includes recognizing a body portion of a target human authorized for administration of a selected electric shock by electro-shock projectiles. In an embodiment, the validating operation may be implemented using the targeting circuit 722 described in conjunction with FIG. 7. The operational flow includes a guidance operation 820 generating in a first steerable electro-shock projectile (i) a first flight path directing a first steerable electro-shock projectile to the recognized body portion of the human and (ii) a second flight path directing a second steerable electro-shock projectile to the recognized body portion of the human. In an embodiment, the guidance operation may be implemented using the guidance circuit 724 described in conjunction with FIG. 7. The operational flow includes a first piloting operation 830 steering the first steerable electro-shock projectile along the first flight path toward the recognized body portion of the target human. In an embodiment, the first piloting operation may be implemented using the first flight controller 726 described in conjunction with FIG. 7. The operational flow includes a communication operation 840 transmitting the second flight path from the first steerable electro-shock projectile to the second steerable electro-shock projectile. In an embodiment, the communication operation may be implemented using the first communication circuit 728 described in conjunction with FIG. 7. The operational flow includes a second piloting operation 850 steering the second steerable electro-shock projectile along the second flight path to the recognized body portion of the target human. In an embodiment, the second piloting operation may be implemented using the second flight controller 766 described in conjunction with FIG. 7. An immobilization operation 860 includes applying a selected electric shock across a first conductive electrode tip of the first steerable electrode in contact with tissue of the recognized body portion of the target human at a first contact point and a second conductive electrode tip of the second steerable electrode in contact with tissue of the recognized body portion of the target human at a second contact point. The electric shock selected to inhibit voluntary movement by the target human without exceeding a safety standard for the recognized body portion of the target human. The immobilization operation may be implemented using either or both signal generator 732 and signal generator 768 described in conjunction with FIG. 7. The operational flow includes an end operation.

In an embodiment of the targeting operation 810, the recognizing includes recognizing in an image a body portion of a target human authorized for administration of a selected electric shock by electro-shock projectiles. In an embodiment, the operational flow 800 includes capturing an image of at least a portion of the target human. In an embodiment, the operational flow includes launching the first steerable electro-shock projectile from a first deployment tube and launching the second steerable electro-shock projectile from a second deployment tube. In an embodiment, the operational flow includes mounting a field interchangeable module in the electro-shock projectile launcher, the field interchangeable module the configured to be removably received by the electro-shock projectile launcher body and having a first deployment tube configured to launch a first steerable electro-shock projectile toward the target human and a second deployment tube configured to launch a second steerable electro-shock projectile toward the target human.

Figure 9:
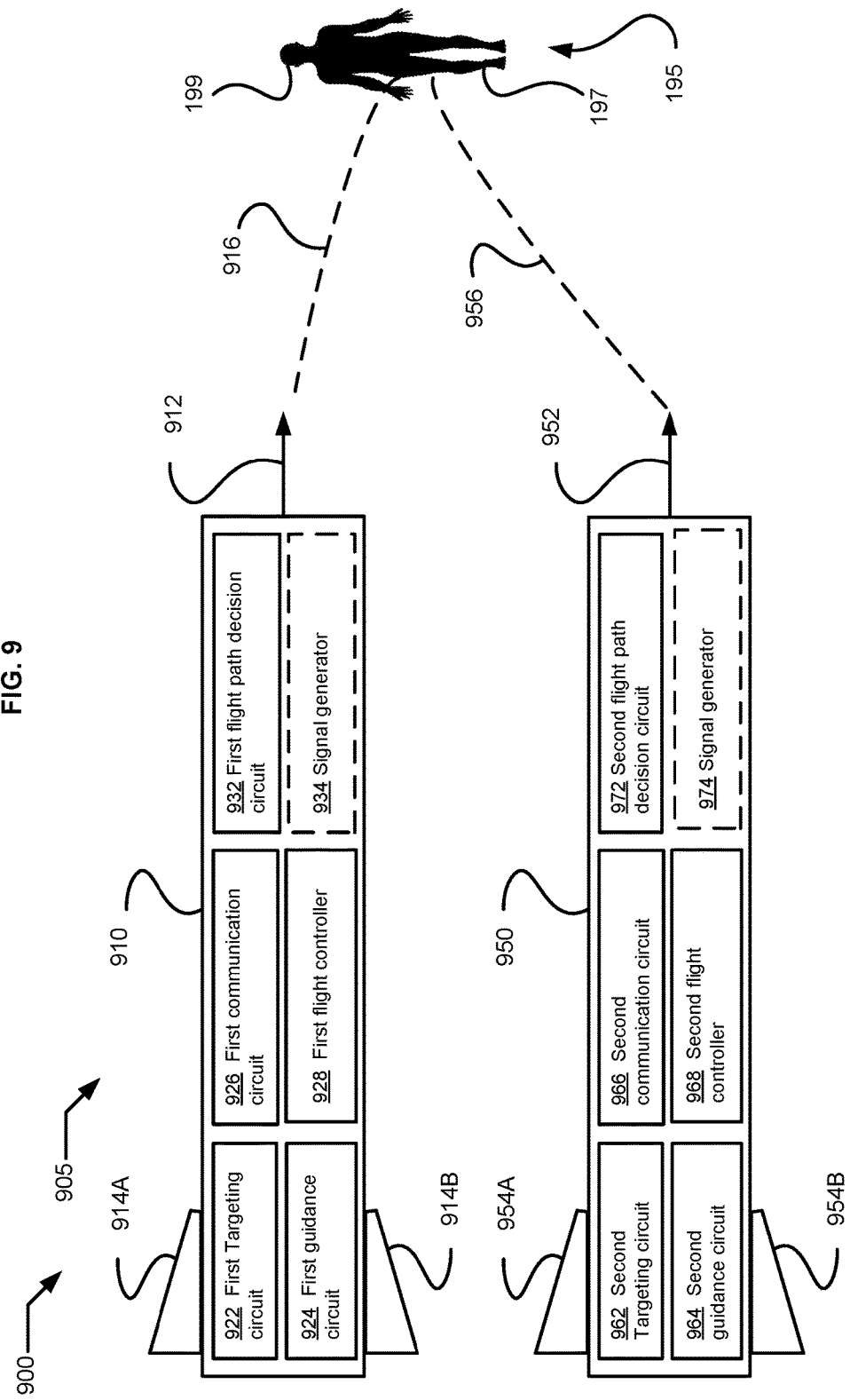
FIG. 9 illustrates an environment that includes the target human and a system.

FIG. 9 illustrates an environment 900 that includes the target human 195 and a system 905. The system includes a first steerable electro-shock projectile 910. The first steerable electro-shock projectile includes a first targeting circuit 922 configured to recognize a body portion of a target human authorized for administration 197 of a selected electric shock by electro-shock projectiles. In an embodiment, the first targeting circuit configured to recognize in a first image a body portion of a target human authorized for administration of a selected electric shock by electro-shock projectiles. The first steerable electro-shock projectile includes a first guidance circuit 924 configured to generate a first set of flight paths (916 and 956) to the recognized body portion for both the first steerable electro-shock projectile and a second steerable electro-shock projectile 950. The first steerable electro-shock projectile includes a first communication circuit 926 configured to communicate with a second steerable electro-shock projectile. In an embodiment, the communication includes the first set flight paths. In an embodiment, the first communication circuit configured to communicate with a second communication circuit 966 of the second steerable electro-shock projectile wirelessly or over a tether between the first steerable electro-shock projectile and a second steerable electro-shock projectile. The first steerable electro-shock projectile includes a first flight controller 928 configured to steer the first steerable electro-shock projectile along the selected first flight path using a first directional control surface to the recognized body portion of the target human. The first steerable electro-shock projectile includes a first flight path decision circuit 932.

The system 905 includes the second steerable electro-shock projectile 950. The second steerable electro-shock projectile includes a second targeting circuit 962 configured to recognize a body portion of the target human authorized for administration 197 of the selected electric shock by electro-shock projectiles. In an embodiment, the second targeting circuit 962 is configured to recognize in a second image a body portion of the target human authorized for administration of the selected electric shock by electro-shock projectiles. In an embodiment, the second targeting circuit may or may not recognize the same body portion as the first targeting circuit 922. The second steerable electro-shock projectile includes a second guidance circuit 964 configured to generate a second set of flight paths (916 and 956) to the recognized body portion for both first steerable electro-shock projectile 510 and the second steerable electro-shock projectile. The second steerable electro-shock projectile includes a second communication circuit 966 configured to communicate with the first steerable electro-shock projectile. In an embodiment, the communication includes the first set flight paths. In an embodiment, the second communication circuit configured to communicate with first communication circuit wirelessly or over a tether between the first steerable electro-shock projectile and a second steerable electro-shock projectile. The second steerable electro-shock projectile includes a second flight controller 968 configured to steer the second steerable electro-shock projectile along the selected second flight path using a second directional control surface 954A or 954B to the recognized body portion of the target human. The second steerable electro-shock projectile includes a second flight path decision circuit 972.

The system 905 includes a signal generator configured to apply the selected electric shock between a first conductive electrode tip 912 of the first steerable electrode 910 in contact with tissue of the recognized body portion 197 of the target human 195 at a first contact point and a second conductive electrode tip 952 of the second steerable electrode in contact with tissue of the recognized body portion of the target human at a second contact point, the electric shock selected to inhibit voluntary movement by the target human. In an embodiment, the first steerable electro-shock projectile 910 includes the signal generator and is illustrated as a signal generator 934. In an embodiment, the second steerable electro-shock projectile includes the signal generator and is illustrated as a signal generator 974.

In the system 905, the first flight path decision circuit 932 and the second flight path decision circuit 972 are configured in combination to select the first flight path 916 to the recognized body portion and to select the second flight path 956 to the recognized body portion. The selections are responsive to the first set of determined flight paths and the second set of determined flight paths. In an embodiment, the first flight path decision circuit 932 and the second flight path decision circuit 972 are configured in combination to select in real time the first flight path to the recognized body portion and to select the second flight path to the recognized body portion. In an embodiment, the first flight path decision circuit 932 and the second flight path decision circuit 972 are configured in combination to select while in-flight the first flight path to the recognized body portion and to select the second flight path to the recognized body portion. In an embodiment, the first flight path decision circuit and the second flight path decision circuit are configured in combination to select based on an arbitration algorithm the first selected flight path to the recognized body portion and the second selected flight path to the another recognized body portion, the selections responsive to the first set of determined flight paths and the second set of determined flight paths. In an embodiment, the arbitration algorithm is responsive to a quality of the first set of determined flight paths and a quality of the second set of determined flight paths. For example, the quality may include a quality of the first image and a quality of the second image. For example, the quality may include a noise level in the first set of determined flight paths and a noise level in the second set of determined flight paths. In an embodiment, the arbitration algorithm is responsive to a probability of each of the determined flight paths in the first and second sets of determined flight paths making contact with the recognized body portion. In an embodiment, the arbitration algorithm is responsive to a relative confidence level in each of the first and second sets of determined flight paths making contact with the recognized body portion.

In an embodiment, the first steerable electro-shock projectile 910 includes a first projectile body configured to be launched by rapidly expanding gas. In an embodiment, the second steerable electro-shock projectile 950 includes a second projectile body configured to be launched by rapidly expanding gas. In an embodiment, the first steerable electro-shock projectile includes a first conductive electrode tip 912 configured to apply the selected electric shock to tissue of the target human 195 at a first contact point. In an embodiment, the second steerable electro-shock projectile includes a second conductive electrode tip 952 configured to apply the selected electric shock to tissue of the target human at a second contact point.

In an embodiment, the first steerable electro-shock projectile 910 includes a first image acquisition device configured to capture a first image of at least a portion of the target human 195. In an embodiment, the second steerable electroshock projectile 950 includes a second image acquisition device configured to capture a second image of at least a portion of the target human. In an embodiment, the first steerable electro-shock projectile and the second steerable electroshock are electrically coupled by a tether.

In an embodiment, the system 905 includes an electro-shock projectile launcher having a first deployment tube configured to launch the first steerable electro-shock projectile and a second deployment tube configured to launch the second steerable electro-shock projectile. The electro-shock projectile launcher 405 described in conjunction with FIG. 4 illustrates an embodiment of the electro-shock projectile launcher of the system 905. In an embodiment, the system 905 includes a handheld structure that includes the electro-shock projectile launcher. In an embodiment, the handheld structure includes an aimable handheld structure. The handheld structure 480 described in conjunction with FIG. 4 illustrates an embodiment of the handheld structure of the system 905.

In an embodiment, the system 905 includes a field interchangeable module configured to be removably mounted on an electro-shock projectile launcher body and having a first deployment tube configured to launch the first steerable electro-shock projectile and a second deployment tube configured to launch the second steerable electro-shock projectile. The field interchangeable structure 412 described in conjunction with FIG. 4 illustrates an embodiment of the field interchangeable structure of the system 905.

All references cited herein are hereby incorporated by reference in their entirety or to the extent their subject matter is not otherwise inconsistent herewith.

In some embodiments, "configured" or "configured to" includes at least one of designed, set up, shaped, implemented, constructed, or adapted for at least one of a particular purpose, application, or function. In some embodiments, "configured" or "configured to" includes positioned, oriented, or structured for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An electro-shock projectile launcher comprising:
   a deployment tube configured to launch an electro-shock projectile toward a target human;
   a recognition circuit configured to recognize a body portion of the target human authorized for administration of a selected electric shock by electro-shock projectiles;
   a guidance circuit configured to determine a flight path of the electro-shock projectile from the deployment tube to the recognized body portion of the target human; and
   an activator circuit configured to initiate a launch from the deployment tube of the electro-shock projectile along the determined flight path in response a received authorization.

2. The electro-shock projectile launcher of claim 1, wherein the activator circuit is configured to record the time when the launch of the projectile is activated.

3. The electro-shock projectile launcher of claim 1, wherein the deployment tube includes an aimable deployment tube configured to launch the electro-shock projectile along a flight path selected from at least different two flight paths.

4. The electro-shock projectile launcher of claim 1, wherein the deployment tube is configured to adjust at least one directional control surface of the electro-shock projectile in response to the determined flight path.

5. The electro-shock projectile launcher of claim 1, wherein the deployment tube is configured to deflect the electro-shock projectile as it departs the deployment tube in response to the determined flight path.

6. The electro-shock projectile launcher of claim 1, wherein the electro-shock projectile is configured to administer an electric shock into tissue of the target human at a contact point, the administered electric shock inhibiting voluntary movement by the target human.

7. The electro-shock projectile launcher of claim 1, further comprising:
   a field interchangeable structure that includes the deployment tube.

8. The electro-shock projectile launcher of claim 7, wherein the field interchangeable structure includes the electro-shock projectile preloaded in the deployment tube.

9. The electro-shock projectile launcher of claim 1, further comprising:
   a handheld structure that includes the electro-shock projectile launcher.

10. The electro-shock projectile launcher of claim 1, further comprising:
    a library of at least one human body portion authorized for administration of the selected electric shock by electro-shock projectiles stored on a non-transitory computer readable media.

11. The electro-shock projectile launcher of claim 10, wherein the library further includes at least one human body portion disapproved for administration of the selected electric shock by the electro-shock projectile.

12. The electro-shock projectile launcher of claim 1, further comprising:
    an image acquisition device configured to capture an image of at least a portion of the target human.

13. The electro-shock projectile launcher of claim 12, wherein the image acquisition device is further configured to capture the image of at least a portion of the target human proximate in time to an initiation of a launch by the activator circuit.

14. The electro-shock projectile launcher of claim 1, wherein the recognition circuit is configured to recognize the target human body portion authorized for administration of the selected electric shock in an image that includes at least a portion of the target human.

15. The electro-shock projectile launcher of claim 1, further comprising:
    a target pointer beam configured to illuminate at least a portion of the target human.

16. The electro-shock projectile launcher of claim 1, further comprising:
    an image acquisition device configured to capture an image of at least a portion of the target human illuminated by a target pointer beam.

17. The electro-shock projectile launcher of claim 16, wherein the recognition circuit is configured to recognize in the captured image at least one body portion of the target human authorized for administration of the selected electric shock by electro-shock projectiles.

18. The electro-shock projectile launcher of claim 1, wherein the electro-shock projectile includes a tethered electro-shock projectile.

19. The electro-shock projectile launcher of claim 1, further comprising:
    a signal generator configured to output a selected electric shock to a conductive filament electrically coupled with a tethered electro-shock projectile and through projectile-contacted tissue of the target human, the electric shock selected to inhibit voluntary movement by the target human.

20. The electro-shock projectile launcher of claim 19, further comprising:
    the conductive filament electrically coupled between the signal generator and the electro-shock projectile.

21. The electro-shock projectile launcher of claim 1, wherein the electro-shock projectile includes:
    a signal generator configured to output a selected electric shock to a conductive tip of the electro-shock projectile and through tissue of the target human contacted by the electro-shock projectile, the electric shock selected to inhibit voluntary movement by the target human.

22. The electro-shock projectile launcher of claim 1, further comprising:
    a dosage circuit configured to select an electric shock that inhibits voluntary movement by the target human but does not exceed a safety standard for the recognized body portion of the human target.

23. The electro-shock projectile launcher of claim 22, further comprising:
    a signal generator configured to output the selected electric shock to a conductive tip of the electro-shock projectile and through tissue of the target human contacted by the electro-shock projectile.

24. The electro-shock projectile launcher of claim 1, wherein the guidance circuit is further configured to adjust inflight at least one control surface of the electro-shock projectile.

25. The electro-shock projectile launcher of claim 1, further comprising:
    a launch safety circuit configured to emit a human perceivable signal if a condition is not met.

26. The electro-shock projectile launcher of claim 1, further comprising:
a launch safety circuit configured to prevent a launch of the electro-shock projectile from the electro-shock projectile launcher if a condition is not met.

27. The electro-shock projectile launcher of claim 1, further comprising:
a fail-safe circuit configured to prevent a discharge of an electrical shock into the target human if the electro-shock projectile-contacted tissue is a body portion not authorized for administration of the selected electric shock.

28. A method comprising:
targeting a human for an administration of a selected electric shock by an electro-shock projectile, the electric shock selected to inhibit voluntary movement by the target human without exceeding a safety standard for the recognized body portion of the target human;
recognizing a body portion of the target human as authorized for administration of the selected electric shock by electro-shock projectiles in response to a library stored on a non-transitory computer readable media of at least two body portions of humans authorized for administration of the selected electric shock by electro-shock projectiles;
determining a flight path of the electro-shock projectile from a deployment tube of an electro-shock projectile launcher to the recognized body portion of the target human; and
initiating a launch of the electro-shock projectile from the deployment tube and along the determined flight path in response a received authorization.

29. The method of claim 28, wherein the targeting further includes illuminating the target human with a target pointer beam.

30. The method of claim 28, wherein the determining includes determining an alignment of the deployment tube implementing a launch of the electro-shock projectile along the determined flight path.

31. The method of claim 28, further comprising:
capturing an image of the target human, and
wherein the recognizing includes recognizing in the captured image at least one body portion of the target human authorized for administration of the selected electric shock by electro-shock projectiles.

32. The method of claim 28, further comprising:
outputting the selected electric shock through tissue of the target human contacted by the electro-shock projectile, the electric shock selected to inhibit voluntary movement by the target human.

33. The method of claim 32, wherein the outputting includes outputting the selected electric shock to a conductive filament electrically coupled with a tethered electro-shock projectile and through tissue of the target human contacted by the electro-shock projectile.

34. The method of claim 28, further comprising:
selecting the electric shock to have an excitation voltage, current, or duration parameter responsive to a safe tolerance level of the recognized target human body portion while inhibiting voluntary movement by the target human.

35. An electro-shock projectile launcher comprising:
at least two deployment tubes, each deployment tube configured to launch a respective electro-shock projectile toward a target human;
a recognition circuit configured to recognize a body portion of the target human authorized for administration of a selected electric shock by electro-shock projectiles launched from respective deployment tubes of the at least two deployment tubes, the electric shock selected to inhibit voluntary movement by the target human;
a guidance circuit configured to determine a first flight path of a first electro-shock projectile from a first deployment tube to the recognized body portion of the target human, and to determine a second flight path of a second electro-shock projectile from a second deployment tube to the recognized body portion of the target human; and
an activator circuit configured to initiate in response to a received authorization a launch from the first deployment tube of the first electro-shock projectile along the first determined flight path and a launch of the second electro-shock projectile from the second deployment tube along the second determined flight path.

36. The electro-shock projectile launcher of claim 35, wherein a first deployment tube of the at least two deployment tubes includes a first aimable deployment tube configured to launch the first electro-shock projectile along a selected first flight path of at least two different first flight paths.

37. The electro-shock projectile launcher of claim 35, wherein a first deployment tube of the at least two deployment tubes is configured to adjust at least one directional control surface of the first electro-shock projectile in response to the first determined flight path.

38. The electro-shock projectile launcher of claim 35, wherein a first deployment tube of the at least two deployment tubes is configured to deflect in response to the first determined flight path the first electro-shock projectile as it departs the first deployment tube.

39. The electro-shock projectile launcher of claim 35, further comprising:
a signal generator configured to apply the selected electric shock across a first conductive electrode tip of the first electro-shock projectile in contact with the tissue of the target human at a first contact point and a second conductive electrode tip of the second electro-shock projectile in contact with the tissue of the target human at a second contact point.

40. The electro-shock projectile launcher of claim 35, wherein a first deployment tube of the at least two deployment tubes is configured to launch a first tethered electro-shock projectile and a second deployment tube of the at least two deployment tubes is configured to launch a second tethered electro-shock projectile.

41. The electro-shock projectile launcher of claim 35, wherein the at least two deployment tubes include at least two field interchangeable deployment tubes, each deployment tube of the at least two deployment tubes configured to launch a respective electro-shock projectile.

* * * * *

UNITED STATES PATENT AND TRADEMARK OFFICE
CERTIFICATE OF CORRECTION

PATENT NO. : 9,903,691 B1
APPLICATION NO. : 15/252440
DATED : February 27, 2018
INVENTOR(S) : Roderick A. Hyde et al.

Page 1 of 1

It is certified that error appears in the above-identified patent and that said Letters Patent is hereby corrected as shown below:

In the Abstract (57), Line 14:
"determined flight path in response a received authorization" should be --determined flight path in response to a received authorization--

Column 23, Line 20, Claim 1:
"the determined flight path in response a received autho-" should be --the determined flight path in response to a received autho- --

Column 25, Line 32, Claim 28:
"in response a received authorization" should be --in response to a received authorization--

Signed and Sealed this
First Day of May, 2018

Andrei Iancu
*Director of the United States Patent and Trademark Office*